No. 612,229. Patented Oct. 11, 1898.
J. F. BARLOW.
ELASTIC TIRE AND RIM FOR WHEELS.
(Application filed Dec. 29, 1897.)
(No Model.) 2 Sheets—Sheet 1.
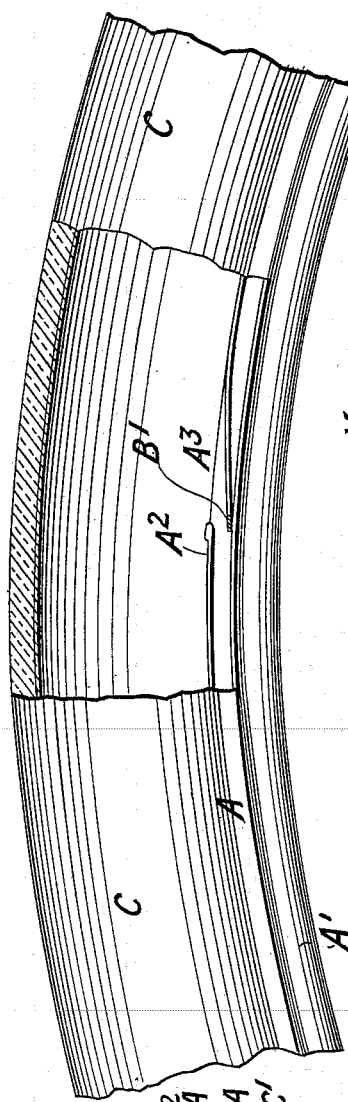
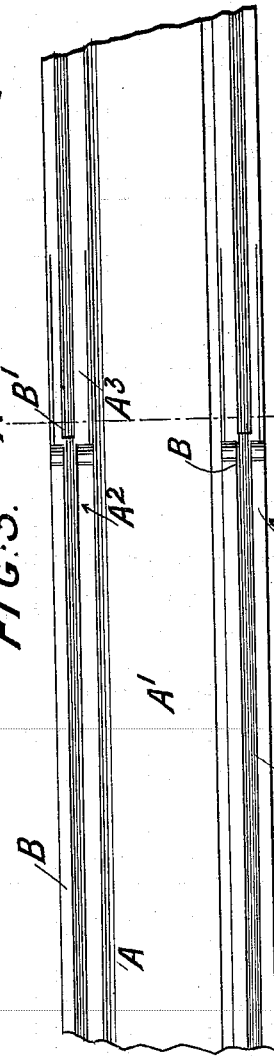
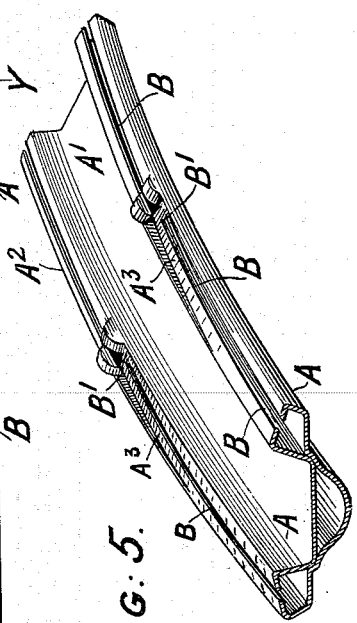
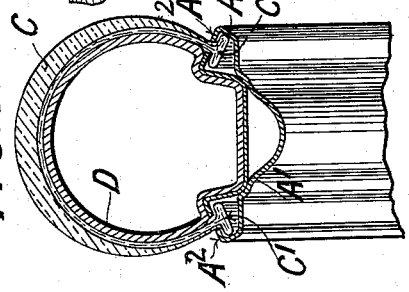
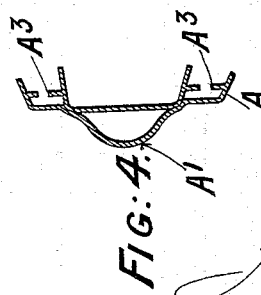

No. 612,229. Patented Oct. 11, 1898.
J. F. BARLOW.
ELASTIC TIRE AND RIM FOR WHEELS.
(Application filed Dec. 29, 1897.)
(No Model.) 2 Sheets—Sheet 2.
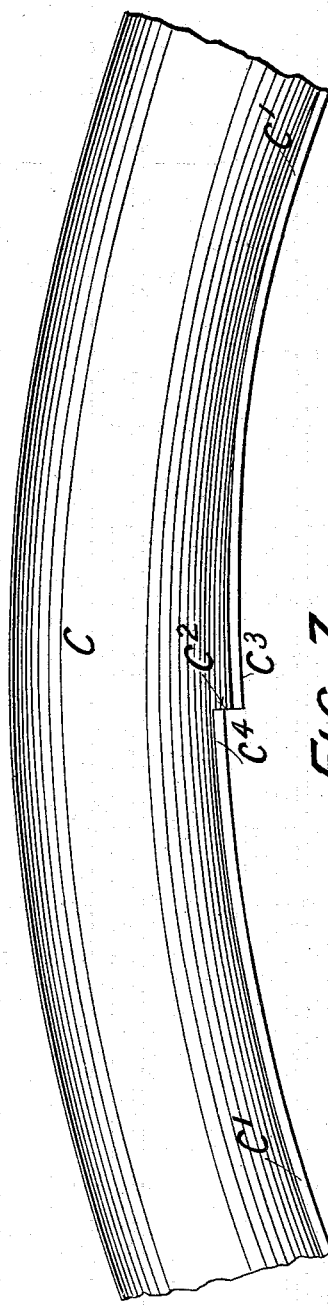
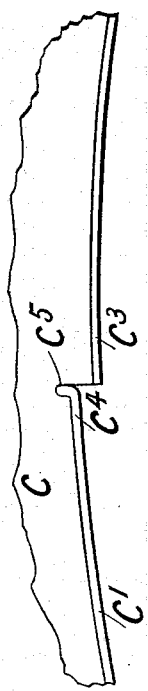
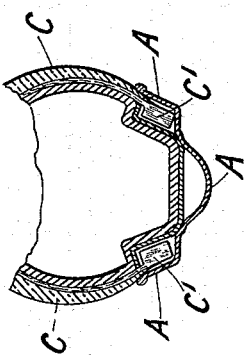
Witnesses
Inventor
Joshua F. Barlow

UNITED STATES PATENT OFFICE.

JOSHUA FIRTH BARLOW, OF COVENTRY, ENGLAND.

ELASTIC TIRE AND RIM FOR WHEELS.

SPECIFICATION forming part of Letters Patent No. 612,229, dated October 11, 1898.

Application filed December 29, 1897. Serial No. 664,476. (No model.) Patented in England February 11, 1897, No. 3,682.

*To all whom it may concern:*

Be it known that I, JOSHUA FIRTH BARLOW, a subject of the Queen of Great Britain, residing at Coventry, in the county of Warwick, England, have invented new and useful Inflated Elastic Tires and Rims or Fellies for Wheels, (for which I have obtained a patent in Great Britain, No. 3,682, bearing date February 11, 1897,) of which the following is a specification.

This invention refers to that class of inflated elastic tires and rims or fellies for same wherein the rim is formed with a circumferential channel at each edge, each channel having a circumferential slot and being divided transversely at one or more places. The tire or outer cover has beaded edges also transversely divided, and such edges are inserted into the rim-channels and the tire or outer cover fixed in position by rotating it circumferentially relatively to the rim. In tires and rims of this character as hitherto constructed or proposed to be constructed disadvantages accruing from the construction and difficulties of manipulation also incident thereto have been experienced, in that to insert the divided edges of the cover into the channels has been troublesome, and the tire or cover after application to the rim having a tendency to "creep"—that is, to move upon the rim through its contact with the road—it has been generally necessary to provide means for covering the divided or open parts of the channels, and the formation of the channels has been such that the tire or cover edges when fitted and drawn sufficiently tight to prevent creeping has rendered it difficult without special appliances to remove the said tire or cover from the rim by reason of its frictional resistance to the circumferential motion.

Now the object of my invention is to produce an improved rim and tire of the class as hereinbefore first stated and at the same time to entirely obviate the disadvantages and difficulties common to the same.

The accompanying drawings show the construction of my improved rim and tire, Figure 1 being a cross-section of the rim and tire in position. Fig. 2 is a side elevation of the same, a part of the tire and rim being cut away to show the formation of a channel at that part where the edge of the tire is to be inserted. Fig. 3 is a plan of the rim, the tire having been removed; and Fig. 4, a cross-section on the line X Y of Fig. 3. Fig. 5 is a perspective view of a part of the rim. Fig. 6 is a side elevation of a portion of the tire or outer cover, showing a division in the edge thereof. Fig. 7 shows a portion of an outer cover edge, showing an enlargement on the said edge; and Fig. 8 is a cross-section showing a slightly-modified construction of rim and tire suitable, for example, for roadster-pattern velocipedes.

According to my invention the channels A at the edges of the rim or felly A' are of somewhat rectangular form in cross-section, as shown, or of other form, if desired, but with the outer peripheral surface $A^2$ flat or approximately flat. In this flat outer surface $A^2$ of each channel I form a circumferentially-extending slot B, or such a slot is formed by the construction shown at Fig. 1 or Fig. 8.

At one or several places around the rim— say for the purpose of this description and as shown at one place, Figs. 2, 3, 4, and 5— I cause the outer surface $A^2$ of one channel to be depressed, as at $A^3$, and in and near the end of this depressed part $A^3$ the circumferential slot B, Figs. 3 and 5, is ended or closed at B', while at a very short distance from the said depressed part $A^3$ of the channel the outer surface of same is divided and stands, as at Fig. 2, above the depressed part $A^3$, presenting the open-ended slot B. The other channel is similarly formed.

In the pneumatic tire proper, or where a double-tube tire is employed, as in the example now described, the outer cover C is formed with enlarged edges C', which in cross-section project at about approximately right angles from each side of the cover or from one side of the cover, as at Fig. 8, although beads of any desired section may of course be used, if desired. Such edges C' may be formed in any convenient manner, generally by folding the canvas and sewing same, and the said edges may be somewhat stiffened and rendered waterproof, but are still flexible and sufficiently extensible to accommodate themselves to exactly fit the circumference of the rim. D, Fig. 1, is the usual inner air-containing tube. The aforesaid edges C' of the outer cover are divided, as at $C^2$, Fig. 6, and are so formed that at the division one part $C^3$ of the edge extends below the adjacent part $C^4$, so that in adjusting the cover C to the rim A' the lower projecting divided edge $C^3$ is inserted into the upstanding open slot of the channel, and the cover C is then moved circumferentially around the rim until this lower projecting part $C^3$ of the edge is brought to the end B' of the slot in the channel, when the adjacent edge $C^4$ at the division will be located in the open and upstanding part of the channel, the whole circumference of the edge of the cover C being then within the said channel. In some cases I may, as is shown at Fig. 7, form an enlargement $C^5$ on each edge of the cover to act as an auxiliary stop to the circumferential motion given to the cover when applying same to the rim. By this construction of the tire or cover C at its edges and divided parts in combination with the construction of the rim A', as aforesaid, I am enabled to at once enter the cover edges at $C^3$ within the channels A without encountering any difficulty in so doing, while the cover C is then simply revolved until it reaches the stop at B', when its proper position is mechanically assured, and the formation of the channels, as at $A^2$, and cover edges C' renders it impossible for the tire when deflated to have become fixed in the channels by the previous tension caused by the inflation or other causes.

Generally I arrange that the india-rubber tread of the outer cover C shall not extend into the channels, and the slot B in the latter need not necessarily be made in the center of the outer surface $A^2$ of the channels A, but may be made, as at Fig. 8, upon one side of same, this arrangement being especially suitable for roadster-tires, it being impossible for wet or dust to enter the grooves.

I claim—

1. The combination with an inflatable tire having enlarged or beaded laterally-projecting edges, extending circumferentially at each side of same, transverse divisions in such edges, the termination of the enlarged edges of the tire being at different levels; of a rim having circumferential channels to receive and hold the enlarged edges of the tire, circumferential slots in the peripheral surfaces of the channels through which the sides of the tire extend, divisions in the said peripheral surface of the channels, the said surfaces on one side of the division being inclined to the bases of the channels where the slots are terminated and form stops for the edges of the tire when in place, the slots of the peripheral surfaces of the channels at the other sides of the divisions being open-ended to permit entry therein of the lower-level terminations of the tire edges, the said tire being circumferentially revolved until brought to rest by the stops with its enlarged edges in the channels as set forth.

2. The combination with an elastic air-containing tube, and an outer cover having laterally-projecting enlargements on its circumferential edges, transverse divisions in such edges, the terminations of the enlarged edges of the cover at the divisions being at different levels; of a rim having circumferential channels, to receive and hold the enlarged edges of the cover, circumferential slots in the peripheral surfaces of the channels, through which the sides of the cover extend, divisions in the said peripheral surfaces of the channels, the said surfaces on one side of the divisions being inclined to the bases of the channels where the slots are terminated, and form stops for the edges of the cover when in place, the slots in the peripheral surfaces of the channels at the other sides of the divisions being open-ended to permit entry thereon of the lower-level terminations of the cover edges, the said cover being circumferentially revolved until brought to rest by the stops, with its edges in the channels as set forth.

JOSHUA FIRTH BARLOW.

Witnesses:
E. G. BREWER,
W. A. MARSHALL.